United States Patent [19]

Nishio

[11] Patent Number: 5,377,108
[45] Date of Patent: Dec. 27, 1994

[54] METHOD FOR PREDICTING IMPACT AND AN IMPACT PREDICTION SYSTEM FOR REALIZING THE SAME BY USING NEURAL NETWORKS

[75] Inventor: Tomoyuki Nishio, Kawasaki, Japan

[73] Assignee: Takata Corporation, Tokyo, Japan

[21] Appl. No.: 45,247

[22] Filed: Apr. 13, 1993

[30] Foreign Application Priority Data

Apr. 28, 1992 [JP] Japan .................... 4-134465

[51] Int. Cl.[5] ............................................ B60R 21/32
[52] U.S. Cl. ........................... 364/424.05; 340/669;
307/10.1; 280/735; 180/282
[58] Field of Search ................... 364/424.05, 424.01,
364/424.1, 194, 164, 178; 340/436, 669;
180/282, 274; 307/10.1; 280/734, 735

[56] References Cited

U.S. PATENT DOCUMENTS

| 4,842,342 | 6/1989 | Takahashi et al. | 364/424.01 |
|---|---|---|---|
| 4,985,835 | 1/1991 | Sterler et al. | 364/424.05 |
| 5,040,118 | 8/1991 | Diller | 364/424.05 |
| 5,225,985 | 7/1993 | Okano | 364/424.05 |
| 5,229,943 | 7/1993 | Eigler et al. | 364/424.05 |
| 5,235,875 | 8/1993 | Yoshida et al. | 364/424.1 |
| 5,267,158 | 11/1993 | Sakaguchi et al. | 364/424.1 |

FOREIGN PATENT DOCUMENTS

4-8639 1/1992 Japan .

*Primary Examiner*—Kevin J. Teska
*Assistant Examiner*—Tyrone V. Walker
*Attorney, Agent, or Firm*—Kanesaka & Takeuchi

[57] ABSTRACT

A method for predicting impact by using neural networks comprising steps of supplying a predetermined crash curve to a first neural network having an intermediate layer to train said first neural network by means of learning calculation and supplying a predetermined air bag deployment limit curve to a second neural network to train said second neural network, supplying data indicative of crash curve obtained by an acceleration sensing device on collision to said first and second neural networks, predicting in said first neural network a time instance at which a threshold displacement is going to reach based on the basis of the training result in said first neural network, comparing in said second neural network data indicative of crash curve on said collision and said air bag deployment limit curve to produce a decision signal of deploying the air bag according to the comparison result, calculating said decision signal and said time instance, to deploy the air bag depending on the impact, and supplying an operation command signal to an air bag deployment operation device.

9 Claims, 8 Drawing Sheets

METHOD FOR PREDICTING IMPACT AND AN IMPACT PREDICTION SYSTEM FOR REALIZING THE SAME BY USING NEURAL NETWORKS

BACKGROUND OF THE INVENTION

This invention relates to a system for predicting impact on a vehicle by using neural networks. In particular, the present invention relates to a method for predicting impact and an impact prediction system for realizing the same by using the neural networks that are previously trained with crash pulses to determine, according to the learning results, if a crash is severe enough to require the deployment of a passive restraint system such as an air bag system for protecting an occupant in a vehicle.

Various techniques have recently been developed to provide the security of an occupant in a vehicle when it crashes. An air bag system is one of such restraint systems to ensure passive safety and is equipped in most automobiles found in a marketplace. A typical air bag system comprises a bag-like cushion, an inflator connected to the cushion, a crash sensor or an air bag sensor, and a determination circuit. When an automobile collides with something the crash sensor detects the impact to supply a detection signal to the determination circuit associated therewith. The determination circuit determines if a crash is severe enough to trigger the inflator. If necessary, the gas-forming agent is burned in the inflator to generate inert gas such as gaseous nitrogen with which the cushion will inflate immediately after the collision. When an occupant is forced into the cushion already deployed, the gas within the air bag flows out of the cushion to absorb impact on the human body. Thus the air bag system will operate such that, in case of emergency, the cushion inflates instantly in response to the pressure of a reaction gas discharged from the inflator, thereby protecting the occupant.

In most cases, the above mentioned crash sensor is a velocity change sensor. The velocity change sensor generally comprises a mass supported by the elastic member that bounces back and force when the entire structure is accelerated or decelerated. When the mass bounces beyond a predetermined amount the velocity change sensor indicates detection of the crash. Such velocity change sensor mounted on a vehicle is required to have sufficiently short response periods relative to the relatively long period of the decelerated crash velocity.

Figure 1A:
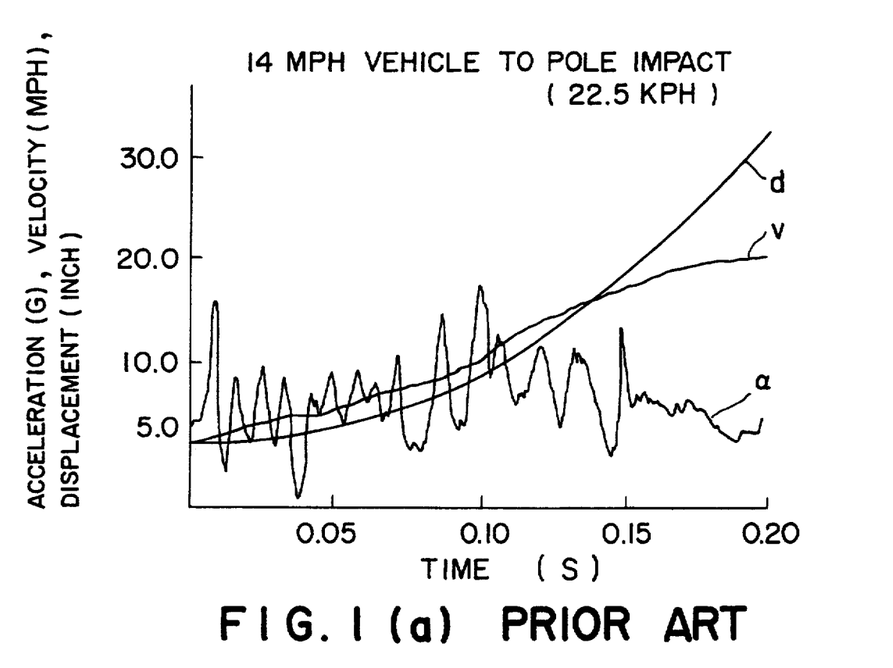
FIG. 1(a) and 1(b) are graphical views showing characteristic curves for acceleration, velocity and displacement for a typical car crashing against a pole at 14 MPH and a barrier at 8 MPH.
Figure 1B:
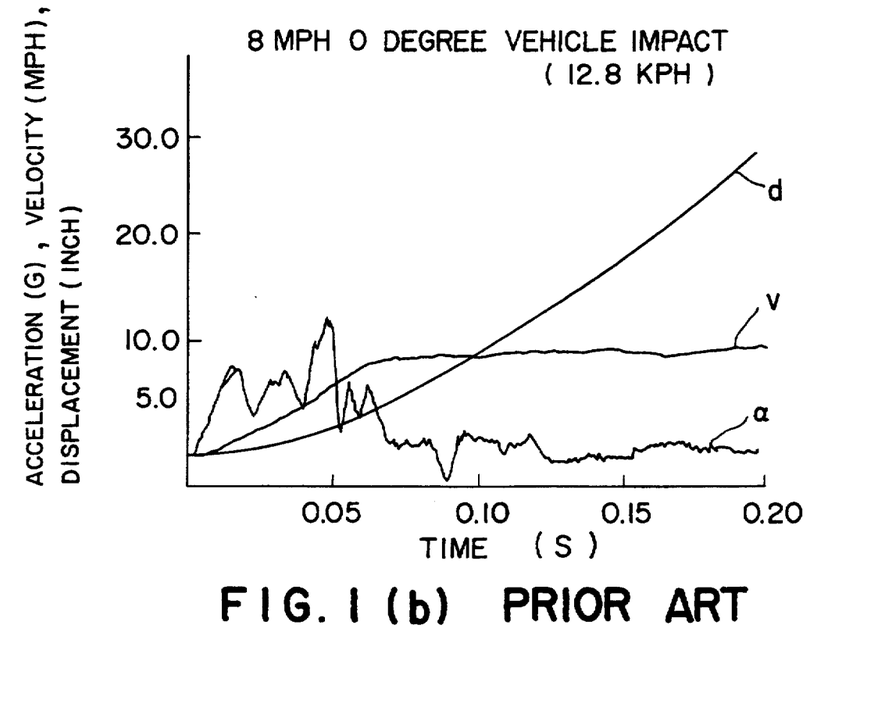

On sudden collision, the curve of acceleration such as a crash pulse has an extremely complex shape and duration thereof is not constant, so that it is difficult to grasp the entire shape and duration of the crash pulse. FIG. 1 shows experimental curves of acceleration, velocity and displacement. As well known in the art, the velocity is obtained by means of integrating the acceleration and the displacement is obtained by means of integrating the velocity. The characteristic curves shown in FIG. 1(a) are obtained when an automobile collides with a pole at 14 miles per hour (MPH) or 22.5 kilometers per hour while FIG. 1(b) shows those obtained on crash at relatively low speed of 8 MPH (=12.8 km/h). In FIGS. 1(a) and 1(b), a, v and d represent characteristic curves for acceleration, velocity and displacement, respectively. As apparent from these figures, the acceleration curve has a complex time-sequential amplitude characteristic. Many approaches have thus been proposed to improve accuracy of collected data or to improve response characteristic for a sensor, thereby reducing the time duration up to detecting the impact.

Newer electronic technologies have developed for this purpose and consideration can now be given to electronic sensors.

Highly sensitized electronic sensors are inevitably complicated in structure as compared with conventional crash sensors. For example, damping of a sensor mass of a conventional sensor depends on the viscous drag or the moment of inertia, which can not be used in the recent electronic sensors. In addition, too much sensitized electronic sensors are prone to deploying the air bag when a restraint is not required.

To solve this problem of incorrect deployment, the determination circuit has been improved in various ways. For example, a plurality of sensors are arranged in parallel and each of them supplies an output signal to a determination circuit. The determination circuit carries out AND operation in response to these output signals. Alternative determination circuit is operable based on a prediction algorithm to calculate prediction parameters according to previously measured values for a plurality of crash pulses. The crash pulses are obtained by tests in practice such as the frontal and rear vehicle collision test.

An integral prediction algorithm may be used as the algorithm of the type described. Sensed data representing the acceleration curve at an initial period of deceleration is supplied to a low-pass filter to remove noise components. The filtered result is integrated in a predetermined manner. This prediction algorithm takes an advantage of the principle that the filtered acceleration curve can be approximated into line segments at a certain gradient. A value of the gradient is used as a parameter to determine whether impact is going to happen.

The air bag system in current application is designed in cooperation with a seat belt device to protect an occupant from being forced into a windshield or a steering wheel. As mentioned above, the cushion of the air bag system is required to be completely deployed during impact just in front of the occupant before the occupant advances too much.

Figure 2:
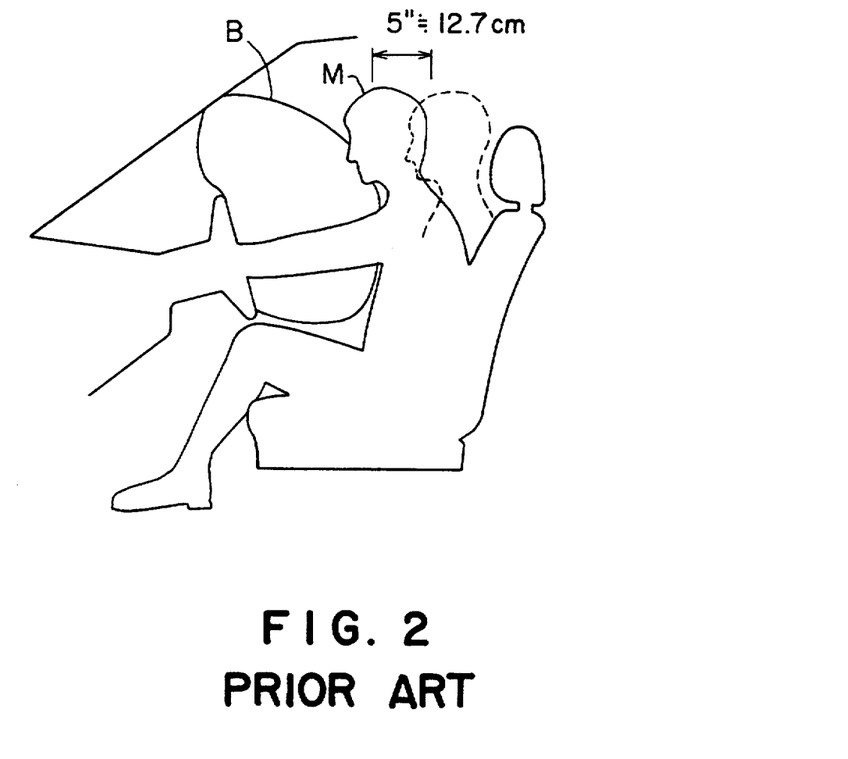
FIG. 2 is a view for use in describing the latest time that a sensor can trigger the air bag system to completely deploy the cushion and provide the proper degree of protection for the occupant.

With respect to a proper balance of a displacement of the occupant and a starting time necessary to initiate deployment of the cushion. The Time to Fire (TTF) is advocated as the nominal reference value for this starting time to trigger the inflator. The TTF is described now concerning FIG. 2. It is assumed that the starting time interval required for completely deploying the air bag B is 30 milliseconds, which is determined on the basis of experiences and previous experiments in practice. In this event, the time instance at which the air bag B starts to deploy coincides with that when the inflator is triggered. T(TTF) can be defined as the time interval from the moment of collision to TTF. Accordingly the T(TTF) can be given by the following equation:

$$T(TTF) = T5'' - 30 \ (ms.) \tag{1}$$

where T5" represents the time interval from the moment of collision to a moment where the head of the occupant is moved five inches ahead from the normal position by crashing force.

Thus the crash sensor must trigger the air bag system before passing this TTF to completely deploy the cushion and provide the proper degree of protection for the occupant.

To calculate the TTF, a value of the accelerated or decelerated velocity is used as a reference parameter for a conventional prediction algorithm. The sensed data supplied from the velocity change sensor is, however, the time sequential data having a non-periodical irregular wave-form with many peaks and valleys. The autocorrelation of such wave-form only results in a featureless pattern. When using the wave-form of the sensed data indicative of change of velocity as a wave-form pattern for analysis an extremely complex algorithm of feature extraction is required to recognize such a wave-form pattern. This means that a conventional program designated for this purpose is capable of extracting the data pattern of the type described only with a complex algorithm designed therefor. The program is, if being completed, less flexible and generalizable to a specification change such as an addition of program function or the like.

In addition, conventional prediction algorithms have no quantitative function to predict change of the value of acceleration or other physical amounts with time after collision. Accordingly it is impossible with this algorithm to previously obtain the actual time instance of the period of T5" after collision. The determination circuit implementing the above mentioned prediction algorithm may determine whether it is necessary to deploy the air bag only according to the result of analogical estimation by means of merely comparing the actual crash pulses with reference crash pulses.

SUMMARY OF THE INVENTION

An object of the present invention is to overcome the problems in the above mentioned conventional techniques.

Another object of the present invention is to provide a method for predicting impact and an impact prediction system for realizing the same by using neural networks.

It is another object of the present invention to provide a method for predicting impact and an impact prediction system for realizing the same by using neural networks that are self-organized and trained during parallel processing to process a large amount of complex data obtained on crash of, for example, an automobile.

It is yet another object of the present invention to provide a method for predicting impact and an impact prediction system for realizing the same by using neural networks that are self-organized and trained during parallel processing to extract features of input data patterns and to establish a time sequential prediction algorithm.

It is still another object of the present invention to provide a method for predicting impact and an impact prediction system for realizing the same by using neural networks that are capable of quantitative prediction to produce output data indicative of an expected condition, and thereby properly determining if the crash is severe enough to trigger the passive restraint system mounted on an automobile or the like.

In order to achieve the above mentioned objects, the present invention is to provide a method for predicting impact comprising steps of: supplying predetermined crash pulses as a first group of parallel training data to a first neural network having an intermediate layer to train said first neural network by means of learning calculation and supplying predetermined air bag deployment limit pulses as a second group of training data to a second neural network to train said second neural network; supplying data indicative of crash pulses obtained by an acceleration sensing device on collision as a set of data having a predetermined time interval to said first and second neural networks; predicting in said first neural network a time instance at which a threshold displacement is going to reach in accordance with a prediction displacement output obtained on the basis of the training result in said first neural network; comparing in said second neural network data indicative of crash pulses on said collision and said air bag deployment limit pulses in accordance with the training result in said second neural network to produce an identification signal indicative of the pros and cons of deploying the air bag according to the comparison result; calculating AND of said identification signal and said time instance at which the threshold is going to reach to determine, in accordance with said AND, the pros and cons of operation to deploy the air bag depending on the impact; and supplying an air bag deployment operation command signal depending on said determination to air bag deployment operation means.

According to the present invention, an adequate weight coefficient is set for the intermediate layer by means of previously training the first and the second neural networks with a plurality of crash pulses as the training data. When an automobile crashes the data indicative of an initial portion of the crash pulse are supplied to the first and the second neural networks for a predetermined time interval to predict the subsequent sequential change of displacement data. As a result it is possible to calculate the time instance when a set threshold displacement value is reached only by means of the data indicative of a part of the crash pulse on collision. In addition, the air bag deployment decision circuit enables the determination of slight crash to produce a signal not to deploy the air bag. Thus it is possible to positively predict and determine if the crash is severe enough to deploy the air bag. In addition, it is possible to trigger the deployment of the air bag, if necessary, at an optimum time instance.

In this event, each of said first and said second neural networks comprises a two dimensional self-organizing competitive learning layer in said intermediate layer to perform learning operation in said two dimensional self-organizing competitive learning layer. Accordingly prediction accuracy for an unknown data can be significantly improved.

The learning calculation is achieved by a back propagation network architecture so that the internal architecture required for learning can be self-organized.

The first group of parallel training data is used for learning calculation by means of converting the crash pulses obtained by calculation in said first neural network into a displacement data. Thus the network is trained with a function that is not so much auto-correlated.

The first group of parallel training data is supplied in parallel to an input layer of said neural network after parallel converting a subsequent displacement value within a predetermined range, and displacement values following to said subsequent displacement values are parallel converted into desired output data to be supplied in parallel to an output layer of said neural network. Accordingly it is possible to positively predict a predetermined threshold value displacement.

In addition, the present invention is to provide a system for predicting impact comprising: displacement prediction means where predetermined crash pulses are supplied as a first group of parallel training data, crash pulse data obtained on collision by an acceleration sensing device is supplied to, as a data set having a predetermined time interval, a first neural network having an intermediate layer already trained by means of learning calculation, and comprising a neural network to predict a time instance at which a threshold value displacement is going to reach in accordance with the training result in said first neural network; air bag deployment decision means where predetermined air bag deployment limit pulses are supplied as a second group of training data said crash pulse data obtained on collision is supplied to a second neural network having an intermediate layer already trained by means of learning calculation and comprising a neural network for identifying the pros and cons of deploying the air bag to produce an identification signal; and a logic circuit where said time instance at which the threshold value is going to reach and said identification signal are supplied to determine the pros and cons of operation to deploy the air bag in accordance with the predicted impact and to produce an air bag deployment operational command signal to air bag deployment operation means.

It is preferable that each of said first and said second neural networks comprises a two dimensional self-organizing competitive learning layer in said intermediate layer to perform learning operation in said two dimensional self-organizing competitive learning layer.

Preferably, the learning calculation is achieved by a back propagation network architecture.

It is preferable that the first group of parallel training data is supplied in parallel to an input layer of said neural network after parallel converting a subsequent displacement value within a predetermined range, and displacement values following to said subsequent displacement values are parallel converted into desired output data to be supplied in parallel to an output layer of said neural network. As a result, it becomes possible to preprocess by means of integration for example and to simplify to a certain degree the acceleration data which is otherwise highly auto-correlated. This results in a less auto-correlated wave-form and more readily self-organization for feature extraction in the neural network. Thus the calculation efficiency in the network can be extremely improved.

In addition, said first and said second neural networks are coded after completion of learning to be implemented in a substrate of an air bag operation control circuit, thereby realizing establish of a small and high-performance air bag operation determination circuit as well as drastically reducing manufacturing costs therefor.

DETAILED DESCRIPTION OF THE PREFERRED EMBODIMENTS

The present invention uses crash pulses obtained upon collision as training data for the neural network. The neural network trained therewith is used as a determination circuit to make prediction to deploy an air bag at a proper timing during collision. A well-known neural network is described first to facilitate an understanding of the present invention and, following which preferred embodiments of the present invention will be described concerning the drawing.

A neural network is the technological discipline concerned with information processing system, which has been developed and still in their development stage. Such artificial neural network structure is based on our present understanding of biological nervous systems. The artificial neural network is a parallel, distributed information processing structure consisting of processing elements (PE) interconnected unidirectional signal channels called connections. Each processing element has a single output connection that branches into as many collateral connections as desired.

A basic function of the PE is described below.

Figure 3:
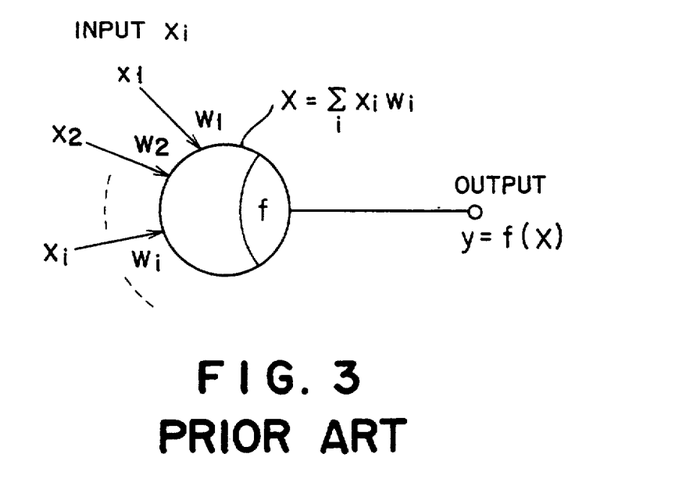
FIG. 3 is a schematic view showing a processing element in the neural network applied to the present invention.

As shown in FIG. 3, each PE can receive any number of incoming functions while it has a single output connection to form multiple output connections. Thus the artificial neural network is by far more simple than the networks in a human brain. Each of the input data x1, x2, ..., xi is multiplied by its corresponding weight coefficient w1, w2, ..., wi, respectively, and the PE sums the weighted inputs and passes the result through a nonlinearity. The PE is characterized by an internal threshold or offset and by the type of nonlinearity and processes a predetermined transfer function to produce an output f(X) corresponding to the sum $(X = \Sigma xi \times wi)$. In FIG. 3, xi represents an output of an i-th PE in an $(s-1)$-th layer and wi represents a connection strength or the weight from the $(s-1)$-th layer to the s-th layer. The output f(X) represents energy condition of each PE. The output of each PE is fed back to other PE by weights. As described above, the network has an energy or an energy function associated with it that will be minimum finally. In other words, the network is considered to be converged and stabilized when outputs no longer change on successive iteration. Means to stabilize the network depends on the algorithm used.

Two exemplified estimation systems are now described in conjunction with the training algorithms therefor.

The back propagation neural network is one of the most important and common neural network architecture, which is applied to the present invention. In this embodiment, the neural network is used to determine if the crash is severe enough to require deployment of the air bag. As well known in the art, the back propagation neural network is a hierarchical design consisting of fully interconnected layers of processing elements. More particularly, the network architecture comprises at least an input layer and an output layer. The network architecture may further comprise additional layer or N hidden layers between the input layer and the output layer where N represents an integer that is equal to or larger than zero. Each layer consists of one or more processing elements that are connected by links with variable weights. The network is trained by initially selecting small random weights and internal thresholds and then presenting all training data repeatedly. Weights are adjusted after every trial using side information specifying the correct result until weights converge to an acceptable value. The neural network is thus trained to automatically generate and produce a desired output for an unknown input.

Basic learning operation of the back propagation neural network is as follows. First, input values are supplied to the neural network as the training data to produce output values, each of which is compared with a correct or desired output value (teacher data) to obtain information indicating a difference between the actual and desired outputs. The neural network adjusts the weights to reduce the difference therebetween. More particularly, the difference can be represented by a well-known mean square error. During training operation, the network adjusts all weights to minimize a cost function equal to the mean square error. Adjustment of the weights is achieved by means of back propagating the error from the output layer to the input layer. This process is continued until the network reaches a satisfactory level of performance. The neural network trained in the above mentioned manner can produce output data based on the input data even for an unknown input pattern.

The generalized delta rule derived with the steepest descent may be used to optimize the learning procedure that involves the presentation of a set of pairs of input and output patterns. The system first uses the input data to produce its own output data and then compares this with the desired output. If there is no difference, no learning takes place and otherwise the weights are changed to reduce the difference. As a result of this it becomes possible to converge the network after a relatively short cycle of training.

Figure 4:
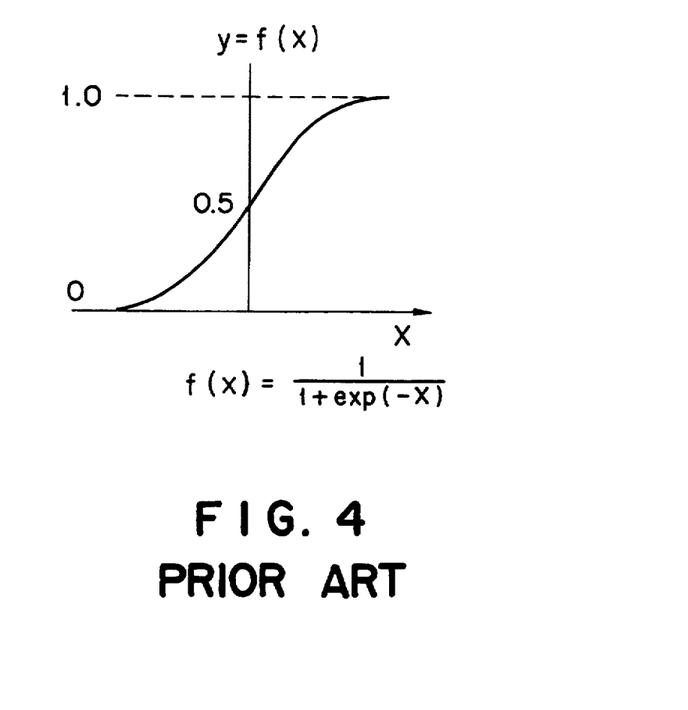
FIG. 4 is a graphical representation of a sigmoid function used as a transfer function for training in the present invention.

To train the net weights on connections are first initialized randomly and input data (training data) are successively supplied to the processing elements in the input layer. Each processing element is fully connected to other processing elements in the next layer where a predetermined calculation operation is carried out. In other words, the training input is fed through to the output. At the output layer the error is found using, for example, a sigmoid function and is propagated back to modify the weight on a connection. The goal is to minimize the error so that the weights are repeatedly adjusted and updated until the network reaches a satisfactory level of performance. A graphical representation of sigmoid functions is shown in FIG. 4, which will be described in detail in conjunction with setting of the transfer function.

The present invention implements the neural network consisting of two separate sections, i.e., a displacement prediction circuit for predicting the TTF and an air bag deployment decision circuit.

Learning Procedure for Displacement Prediction Circuit

Now, a training schedule for the displacement prediction circuit is described below.

(1) Collect Crash Pulses supplied from the Velocity Change Sensor

Figure 5:
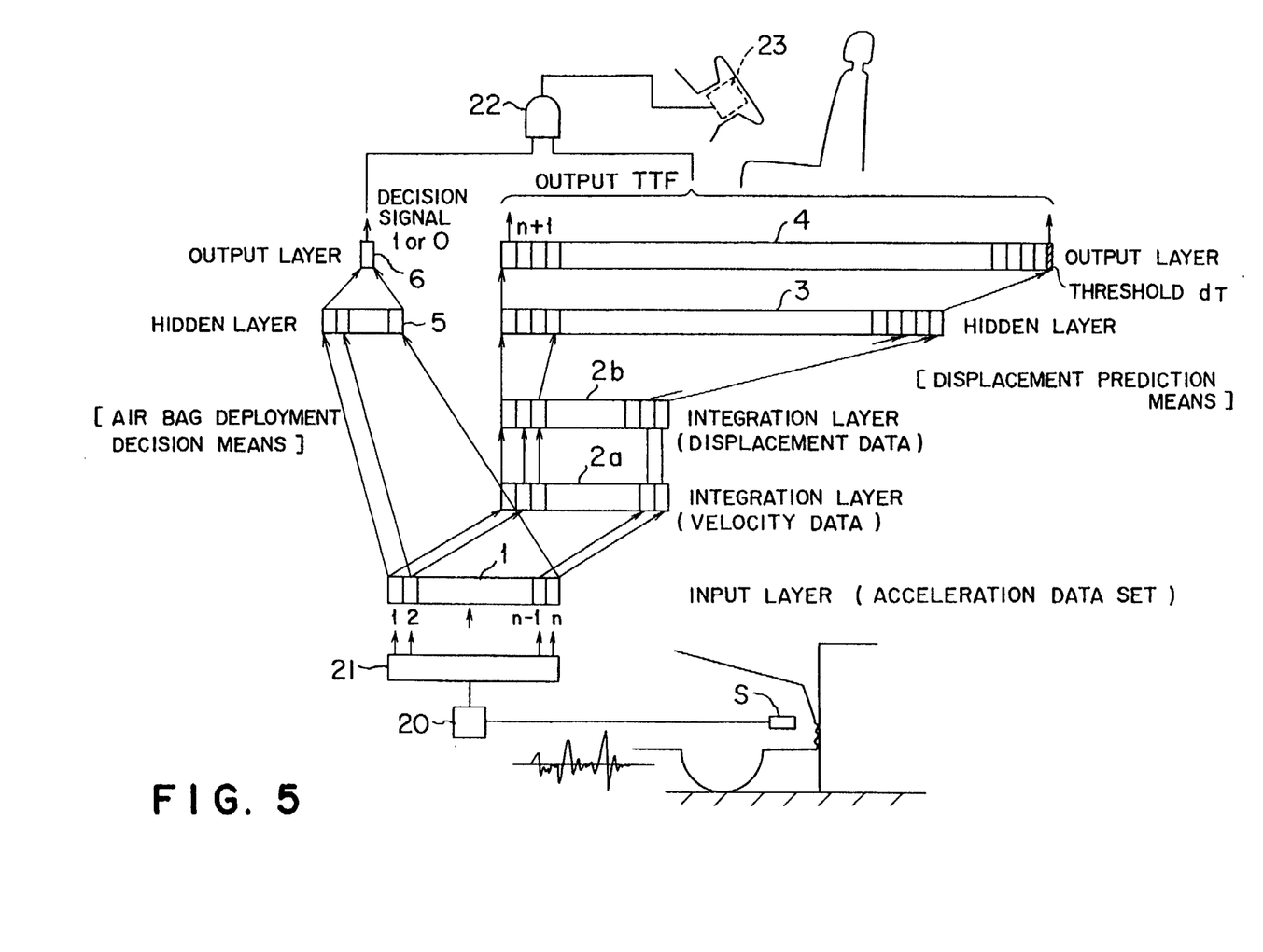
FIG. 5 is a schematic structural diagram of an impact prediction system implementing the neural networks according to a first embodiment of the present invention.

As shown in FIG. 5, a velocity change sensor S as a acceleration sensing device is mounted on an automobile at a front portion thereof to supply a crash pulse to a filter (not shown). The filter may be a low-pass filter to remove noise components therefrom. The filtered result is supplied to an A/D converter 20 as analog data. The A/D converter 20 converts the analog data into digital data. The digital data are subject to sampling with the sampling range $\Delta T$ and the sampling period $\Delta t$. In this embodiment, the sampling range $\Delta T$ is equal to 200 milliseconds and the sampling period $\Delta t$ is equal to 0.1 milliseconds.

(2) Process the Crash Pulse Data (Preprocessing)

The collected data are supplied to the input layer 1 of the neural network through an input interface 21 as the acceleration data. The acceleration data are then supplied to a first intermediate layer $2a$ where they are integrated to obtain velocity data. The velocity data are supplied to a second intermediate layer $2b$ where they are integrated to obtain displacement data. Thus the present embodiment uses two intermediate layers to integrate the acceleration data, thereby a series of displacement data can be given as the outputs of the second intermediate layer $2b$. In this event, each of the weight coefficients for the first and the second intermediate layers is set to one.

An amount of displacement for every predetermined time interval can be readily obtained by using the above mentioned sampling period $\Delta t$ because the crash pulse data sequence uniquely corresponds (in a mapping relation) to the displacement data sequence. The crash pulse data can also be used to obtain other data by means of carrying out a predetermined calculation. Examples of such data are a jerk force (calculated by differentiating the value of acceleration) and an amount of change of the velocity. These physical amounts can equally be used as the training data.

(3) Neural Network Architecture

The neural network architecture implemented to the present invention is a hierarchical design as shown in FIG. 5. The input layer 1 consists of n (in this embodiment, n is equal in number to sixty-four) processing elements arranged in parallel. Each processing element in the input layer 1 is fully connected in series to the processing elements in the first intermediate or integration layer $2a$. Likewise, each processing element in the first integration layer $2a$ is fully connected in series to the processing elements in the second intermediate or integration layer $2b$. The second integration layer $2b$ is connected to a third intermediate layer 3 consisting of n (in this embodiment, n is equal in number to one) processing elements. These first, second and third intermediate layers are the hidden layers of the network. The third hidden layer 3 is connected to an output layer 4 consisting of m (in this embodiment, m is equal in number to three hundreds) processing elements arranged in parallel.

Each output of the input layer 1 is also supplied to a fourth hidden layer 5. It is noted that this hidden layer 5 has no direct connection with the first through third hidden layers. Each processing element in the fourth hidden layer 5 is connected to an output layer 6 of a single processing element that produces a decision signal described below. This output layer 6 is referred to the output unit hereinafter. The combination of the fourth hidden layer 5 and the output unit 6 serves as the air bag deployment decision circuit. It should be considered that each processing element is fully interconnected to the other processing elements in the next layer though only a part of which are shown in FIG. 5 to brevity of the figure.

(4) Set the Transfer Function

In this embodiment a sigmoid function as shown in FIG. 4 is applied as the transfer function for the network. The sigmoid function is a bounded differentiable real function that is defined for all real input values and that has a positive derivative everywhere. The central portion of the sigmoid (whether it is near 0 or displaced) is assumed to be roughly linear. With the sigmoid function it becomes possible to establish effective neural network models.

As a sigmoid function parameter in each layer, a y-directional scale and a y-coordinate offset are set which in this embodiment have values as shown in Table 1 below. As apparent from Table 1 the y-directional scale is defined for each layer to exhibit exponential variation. This results in improved convergence efficiency of the network.

It is readily understood that other functions may be used as the transfer function. For example, in a sinusoidal function a differential coefficient for the input sum in each processing element(PE) is within a range equal to that for the original function. To use the sinusoidal function results in extremely high convergence of training though the hardware for implementing the network may be rather complex in structure.

(5) Learning Procedure and the number of Training Data

In the present embodiment a series of sequential discrete data indicative of displacement is divided into n data elements (n represents a positive integer that is equal in number to the PEs in the input layer of the neural network). In other words, the series of time

TABLE 1

| Parameter | Scale | Offset |
|---|---|---|
| Input Layer | linear | 0 |
| Hidden Layer 1 | $2^2$ | $-2^1$ |
| Hidden Layer 2 | $2^1$ | $-2^0$ |
| Output Layer | $2^0$ | 0 |

Note: Scales are relative values sequential discrete data is picked up as continuous n serial data elements. The n serial data elements are converted into first parallel data elements to be supplied in parallel to the n PEs in the input layer as the training data. The n data elements indicative of displacement are followed by m data elements indicative of displacement that are also converted into second parallel data elements. The second parallel data elements are supplied to the PEs in the output layer as desired output data. In this embodiment n is equal in number to sixty-four and m is equal in number to three hundreds.

Figure 6:
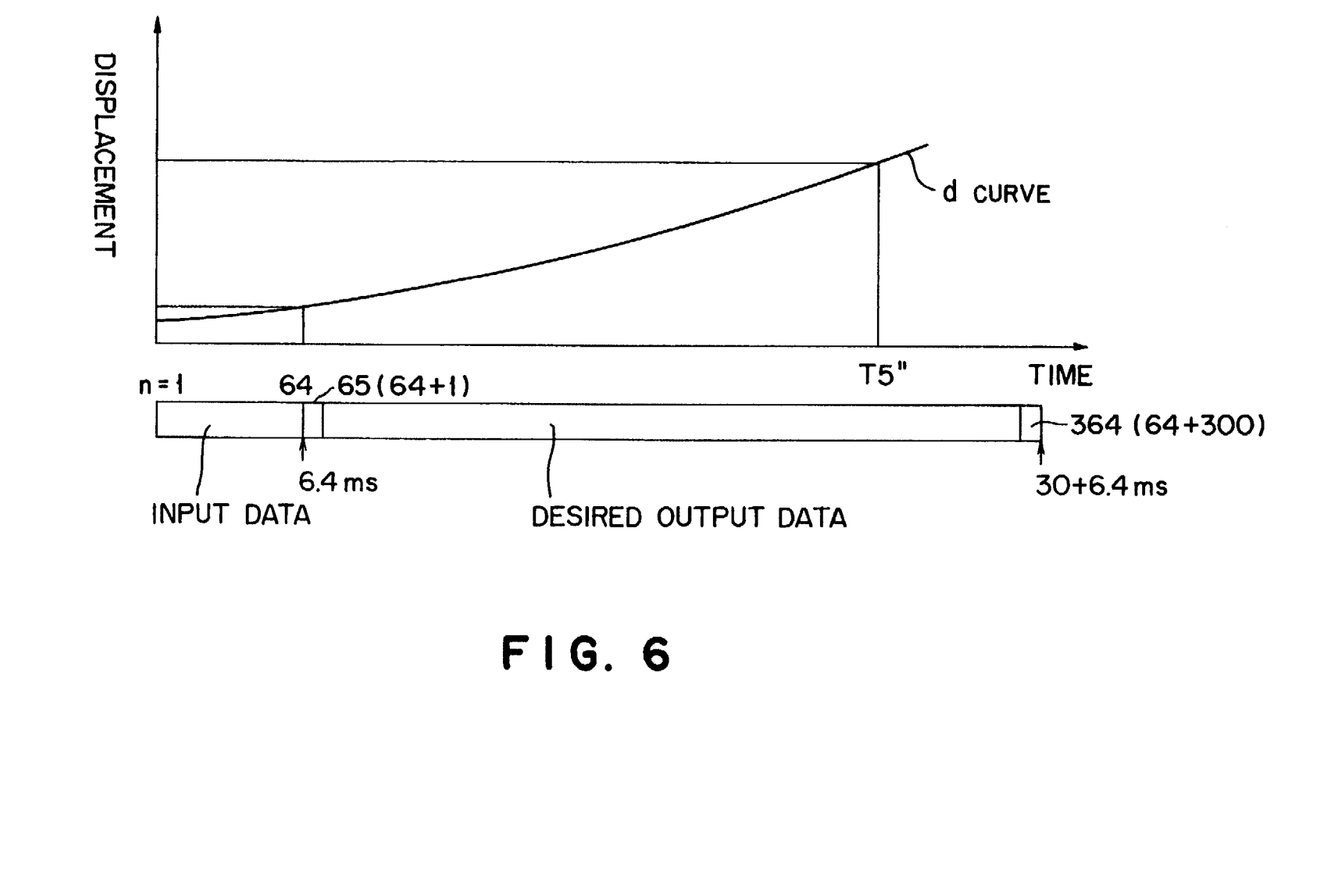
FIG. 6 is a graphical representation of the parallel data obtained by conversion and a displacement curve d represented by the original data.

FIG. 6 is a graphical representation of the parallel data obtained by conversion and a displacement curve d represented by the original data. The input data used for training and the desired output data can be represented in series as the bar chart shown in the lower part of the figure.

Now description is made regarding to the time intervals for the input and desired output data concerning FIG. 6.

The time interval for the input data is ($\Delta t \times n$) milliseconds because the data sampling period in this embodiment is $\Delta t$. In addition, the time interval for the desired output data is equal to ($\Delta T \times m$) milliseconds. In this embodiment $\Delta t$ is equal to 0.1 milliseconds so that the set time intervals for the input data and the desired output data are 6.4 milliseconds and 30 milliseconds, respectively.

The time interval of 30 milliseconds corresponds to the period required for completely deploying the above mentioned air bag. In this way the time duration required for completely deploying the air bag can be represented by the product of the number of data and the sampling time. The longer sampling period makes it possible to establish the back propagation network architecture with less data and thus to simplify the network structure.

A set of parallel data elements can be dealt with as the time sequential serial data by means of defining the parallel data with a predetermined time interval. If the last data element of the desired output data corresponds to a threshold dT for obtaining the T5'', the last data element of the input data may correspond to the TTF.

Figure 7:
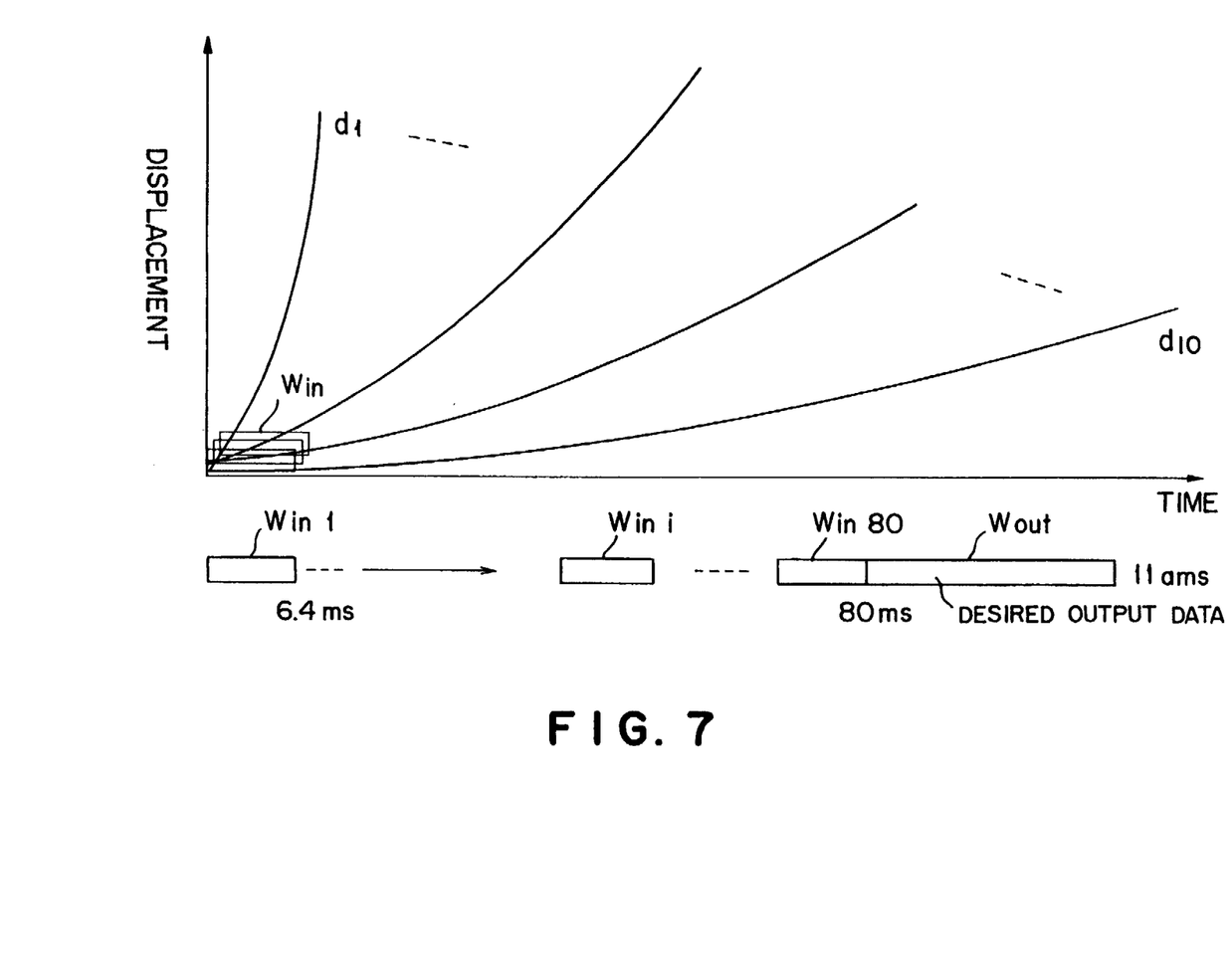
FIG. 7 is a view for use in describing a procedure for supplying the parallel data to the input layer in conjunction with the displacement curve.

According to the present embodiment the iterative calculation is carried out in practice by a computer such that eighty sets of parallel data are subsequently supplied to the each PEs of input layer for every one millisecond as shown in FIG. 7. It is noted that the number of the data sets may be any one of an adequate positive integer as much as the feature extraction can be readily made on the displacement curve.

FIG. 7 is a view for use in describing a procedure for supplying the parallel data to the input layer in conjunction with the displacement curve. A set of data having a predetermined time interval (which is equal to 6.4 milliseconds in this embodiment) is defined as a window Win. The window Win is repeatedly supplied to the input layer by eighty times for every one millisecond. A set of the eighty input data corresponds to one training data. On the other hand, a subsequent set of data indicative of displacement is defined as a window Wout of the desired output data.

Training will go on with two different data sets supplied simultaneously and in parallel to the input layer and the output layer, respectively, of the neural network.

In the present embodiment ten different displacement curves (d1~d10) are used as several kinds of the training data to train the neural network. The training operation is repeated for the predetermined training cycle. The convergence error limitation may be arbitrarily determined as much as the continuity is obtained at the boundary between the input value and the output value.

In addition, the time interval for the input window may be any one of an adequate interval within the range where the serial data can be effectively used. In this event the time interval for the window may be more effective when being extended to the range consisting of the input data in one window and where the feature of the displacement curve can be readily extracted.

The number of the training data, the displacement data and the number of training cycle may be properly set depending on each training result and is not limited to the above mentioned values.

(6) Examples of the training data and the unknown data.

In Table 2 each shaded box represents an example of a pair of data, the input data and the desired output data, used for training the neural network. In the remaining cases, the input data are supplied to the network to confirm the output thereof.

In Table 2 both the Desired TTF and the Measured TTF are dealt with time intervals from the moment of the collision to the TTF.

Learning Procedure for the Air Bag Deployment Decision Circuit

After completion of the training of the neural network in the displacement prediction circuit the time instance when the threshold value corresponding to the five-inch displacement of the occupant's head is obtained as the prediction data means the T5" after 30 milliseconds. In other words, it is just the time instance of recognizing the arrival of the threshold value that corresponds to the TTF.

If the desired TTF is in the "OFF condition" not to deploy the air bag as shown in A-10 in Table 2 the time interval 72.4 milliseconds is obtained in calculation as the value for T5" that corresponds to the five-inch displacement. Thus the T(TTF), time interval from the moment of collision to TTF, can be given as follows:

$$T(TTF) = 72.4 - 30.0 = 42.4 \ (ms.).$$

Such a long-time T(TTF) may occur during collision at relatively low speed, where it is unnecessary to deploy the air bag. To eliminate the data like this it is possible to restrict the time interval. However, the desired TTF may be in the "ON condition" where the air bag should be deployed even when the T(TTF) is equal to 45 milliseconds as shown in B-8 in Table 2. Accordingly it is impossible to uniformly restrict the time interval.

With respect to this the present invention provides the air bag deployment decision circuit independent of the neural network for predicting the displacement. The air bag deployment decision circuit decides whether the inflator is required to be triggered to deploy the air bag. The input layer 1 is commonly used for both of the air bag deployment decision circuit and the above mentioned displacement prediction circuit. Thus these circuits are operable with the same input data as clearly shown in FIG. 5.

In the air bag deployment decision circuit a plurality of acceleration data are previously used as the training data, which the acceleration data correspond to the critical or limit crash pulses of the pros and cons of air bag deployment. The neural network in the air bag deployment decision circuit learns the air bag deployment critical or limit crash pulses to determine if the impact that caused the crash pulse is reached to the level to deploy the air bag.

In addition to the prediction for the TTF carried out by the displacement prediction circuit, the air bag deployment decision circuit supplies a decision signal indicative of the pros and cons of deploying the air bag to the output unit 6. In this event the decision signal may be a logic "1" and "0" for representing "to deploy" and "not to deploy" the air bag. Thus it is possible to determine if the inflator should be triggered according to the crash pulse and the decision signal.

The decision signal and the output TTF supplied from the displacement prediction circuit are fed to a logic circuit 22 to obtain AND of both signals. The logic circuit 22 supplies an operational command to an inflator 23 of the air bag system only when the decision signal and the TTF represent to initiate the inflator.

With the logic circuit 22 to produce AND, it is possible to prevent unnecessary or incorrect deployment of the air bag.

TABLE 2

| Type A | A-1 | A-2 | A-3 | A-4 | A-5 | A-6 | A-7 | A-8 | A-9 | A-10 | A-11 |
|---|---|---|---|---|---|---|---|---|---|---|---|
| Velocity (MPH) | 35 | 35 | 30 | 34 | 34 | 34 | 14 | 12 | 10 | 8 | 15 |
| Impact Position | F | F | F | L | L | R | F | F | F | F | F |
| Desired TTF | 15 | 15 | 15 | 34 | 34 | 34 | ON | ON | ON | OFF | ON |
| Measured TTF | 15 | 15 | 15 | 25 | 23 | 27 | 23 | 25 | 25 | OFF | 41 |

| Type B | B-1 | B-2 | B-3 | B-4 | B-5 | B-6 | B-7 | B-8 |
|---|---|---|---|---|---|---|---|---|
| Velocity (MPH) | 31 | 31 | 30 | 30 | 15 | 8 | 31 | 31 |
| Impact Position | F | F | R | R | F | F | P | P |
| Desired TTF | 15 | 15 | 34 | 34 | ON | OFF | 30 | 45 |
| Measured TTF | 15 | 15 | 33 | 31 | 23 | OFF | 35 | 26 |

| Type C | C-1 | C-2 | C-3 | C-4 | C-5 | C-6 | C-7 | C-8 |
|---|---|---|---|---|---|---|---|---|
| Velocity (MPH) | 30 | 30 | 30 | 8 | 16 | 30 | RO | RO |
| Desired TTF | 30 | 30 | 30 | TH | TH | 15 | | |
| Measured TTF | 17 | 33 | 35 | 39 | 25 | 15 | OFF | OFF |

F:Front L:Left side R:Right side P:Pole RO:Rough road TH:Threshold

Prediction Operation on Vehicle in Practice

An embodiment is described now for the impact prediction system using the neural networks according to the present invention being applied to an automobile.

The neural network program that has already been trained can be memorized in a read only memory (ROM) as an application. In this event the network program is memorized after compiled and translated into a machine language. The ROM is implemented in a predetermined IC chip or the like as an inherent circuit. The IC chip is mounted on a circuit for the air bag system in an automobile.

Figure 8:
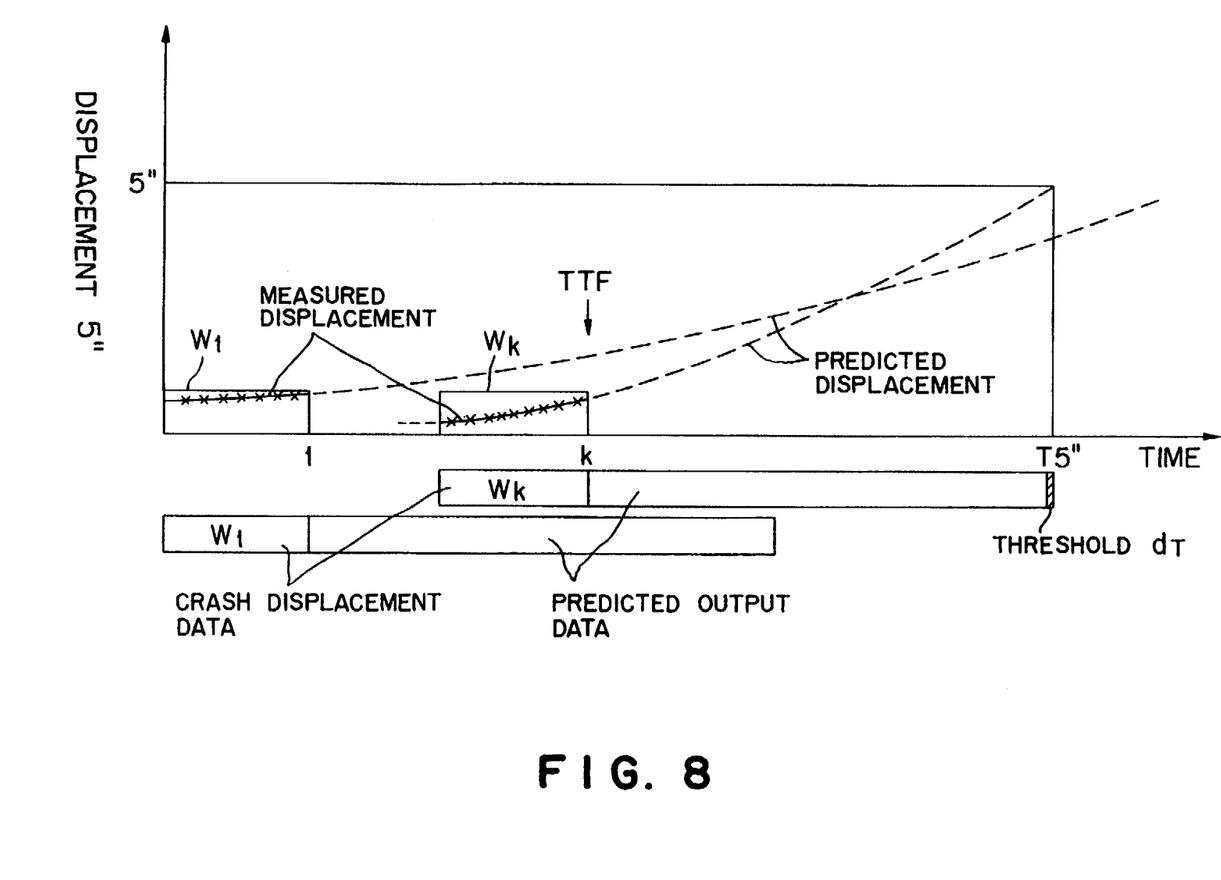
FIG. 8 shows data subsequently converted into a set of parallel data consisting of the windows Win having a predetermined window interval.

In the automobile comprising such impact prediction circuit for deciding deployment of the air bag a velocity change sensor associated therewith is initiated when a driver operates an ignition switch to turn the ignition on, enabling the engine to be started. The velocity change sensor detects change of velocity to supply data indicative of the sensed value as the analog data to the A/D converter 20. The A/D converter 20 converts the analog data into the digital data to supply to the input interface 21. The data are subsequently converted into a set of parallel data consisting of the windows Win having a predetermined window interval as shown in FIG. 8. Each set of the parallel data is subsequently supplied to the input layer 1 of the neural network, which is implemented in the circuit board, as the parallel data at a predetermined time duration.

On normal driving condition the accelerated velocity generated by changing the velocity is considered as a noise component to be removed by means of adequate noise removing means such as an analog low-pass filter. Accordingly, the input layer 1 of the neural network subsequently receives data having zero values during normal or ordinary driving.

When the automobile crashes the velocity change sensor S supplies data indicative of the decelerated crash velocity to the A/D converter 20. The data are supplied to the neural network through the input interface 21 as a predetermined window Win. The neural network calculates the weights for the series of data, which results in almost instantaneous production of an prediction output data corresponding to the displacement data for 30 milliseconds after the input data. The input acceleration data are varied to time and comes to the threshold dT, corresponding to the five-inch displacement, it terminates the calculation of the weights. The value is produced as the TTF which the value corresponds to the last time instance in the data set for the window Wink. The logic circuit 22 calculates AND product of the obtained TTF and the decision signal supplied from the air bag deployment decision circuit.

In this way it is possible for the present invention to positively predict the T5" at least 30 milliseconds earlier than the T5" to determine if it is required to deploy the air bag according to the TTF then.

The decision may be made by the neural network which is self-organized with the training data. Accordingly it is possible to improve accuracy of decision by means of further training the network with a simple algorithm.

Another embodiment of the present invention will be described below in which the neural network comprises an intermediate layer having a self-organization function and a competitive learning function to positively respond to various unknown data with less training data. As well known in the art, in the self-organization a network modifies itself in response to inputs. Examples of the use of self-organizing training include the competitive learning law applied to the present embodiment.

Figure 9:
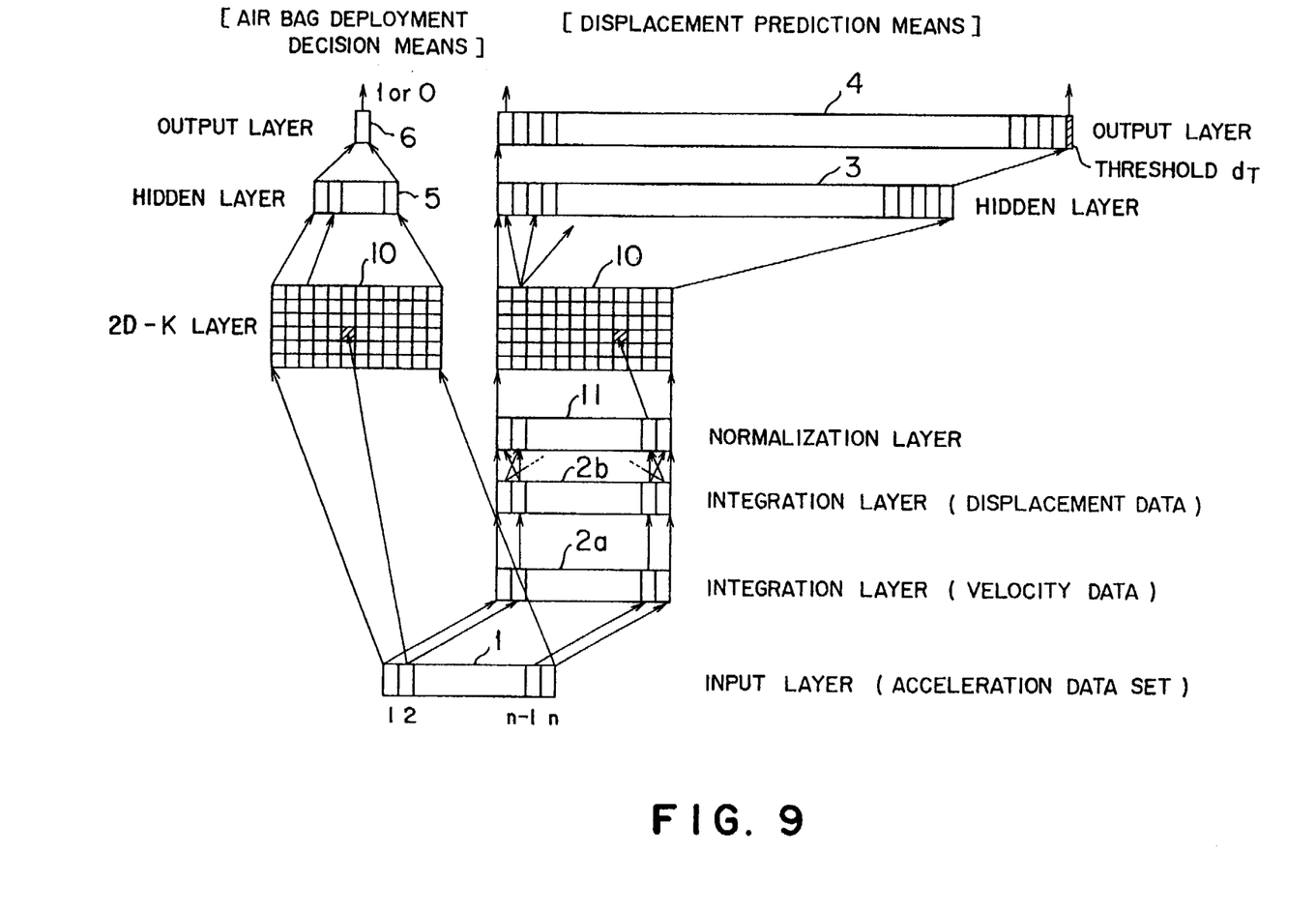
FIG. 9 is a schematic structural diagram of an impact prediction system implementing the neural networks according to a second embodiment of the present invention.

As shown in FIG. 9 the neural network according to this embodiment comprises a two dimensional self-organized competitive learning layers 10 interconnected to the hidden layers 3 and 5, respectively. The two dimensional self-organized competitive learning layers 10 are referred as the two dimensional Kohonen layer (2D-K layer) each of which in this embodiment consists of forty (8×5) processing elements. The processing elements in the 2D-K layer compete with one another to determine the "winner" on the basis of minimum distance. More particularly, a predetermined distance can be obtained by, in this embodiment, forty processing elements for each set of the input data. An attribute for each of the sixty-four input patterns is normalized facilitating determination for attributes of unknown data.

More particularly, the winning three Kohonen's processing elements are determined among the forty processing elements to supply output data. Unknown data are preprocessed on the basis of classification for the input data due to the self-organization on learning. The output value thereof is supplied to the subsequent hidden layer.

With an additional normalization layer 11 interconnected to the 2D-K layer 10 as shown in FIG. 9, the learning efficiency in the 2D-K layer 10 will be sufficiently improved. Addition of the 2D-K layer 10 contributes to a surprising number of information processing capabilities for unknown data as well as a remarkably improved convergence efficiency on learning.

The neural network having the 2D-K layer can be completed by means of expanding the above mentioned back propagation method so that the learning procedure can be determined in a similar manner as in the back propagation method.

The self-organization requires that the system uses, during adaptation of initial several thousands' times, no other information other than the incoming patterns and no data are fed back from the output layer. After completion of self-organization the network is trained according to the back propagation algorithm. The neural network having a structure according to this embodiment can be trained with less data for a shorter period of training cycle.

In the above mentioned second embodiment the neural network already trained can be programmed by using a machine language and compiling to provide a simple executional application. The neural network may be implemented into a chip as a control microprocessor package. In this event, the network can be memorized in a read only memory for every one type of an automobile. Consequently it becomes possible to establish a prediction system using a simple neural network for each of the various types of automobiles, which allows considerable savings in cost.

For an algorithm that is readily established in logical a well known expert system can be applied to achieve a prediction system using a combination logic circuit for the neural network and the expert system.

What is claimed is:

1. A method for predicting impact by using neural networks comprising steps of:
   supplying a predetermined crash curve as a first group of parallel training data to a first neural network having an intermediate layer to train said first neural network by means of a learning calculation of a back propagation network architecture and supplying a predetermined air bag deployment limit curve as a second group of training data to a second neural network to train said second neural network by a back propagation network architecture;
   supplying data indicative of a crash curve obtained by an acceleration sensing device when collision occurs as a set of data having a predetermined time interval to said first and second neural networks;
   predicting, based on initial data of the crash curve obtained from said first neural network, a displacement output from the initial data of the crash curve on the basis of the training result in said first neural network, and obtaining, based on the displacement output from the initial data, a time to reach the threshold for maximum occupant displacement in which an air bag can be opened to protect an occupant,;

comparing in said second neural network data indicative of the crash curve on said collision in accordance with the training result in said second neural network and data obtained from the air bag deployment limit curve, and outputting a decision signal indicative of deploying the air bag only when the data for the crash curve are greater than the data from the air bag deployment limit curve; and supplying an air bag deployment operation command signal only when the time to reach the threshold for maximum occupant displacement is obtained in the first neural network and when the second neural network outputs the decision signal indicative of deploying the air bag.

2. A method for predicting impact by using neural networks as claimed in claim 1, wherein each of said first and said second neural networks comprises a two dimensional self-organizing competitive learning layer in said intermediate layer to perform learning operation in said two dimensional self-organizing competitive learning layer.

3. A method for predicting impact by using neural networks as claimed in claim 1, wherein said first group of parallel training data is used for learning calculation by means of converting the crash curve obtained by calculation in said first neural network into displacement data.

4. A method for predicting impact by using neural networks as claimed in claim 3, wherein said first group of parallel training data is supplied in parallel to an input layer of said first neural network after parallel converting a subsequent displacement values within a predetermined range, and displacement values following to said subsequent displacement values are parallel converted into a desired output data to be supplied in parallel to an output layer of said first neural network.

5. A system for predicting impact by using neural networks comprising:

displacement prediction means where crash curve data obtained on collision by an acceleration sensing device are supplied, as a data set having a predetermined time interval, to a first neural network having an intermediate layer already trained by means of a learning calculation of a back propagation network architecture and supplied with a predetermined training crash curve as a first group of parallel training data, said first neural network predicting a displacement output after initial crash curve data and obtaining a time to reach a threshold for maximum occupant displacement in accordance with the training result in said first neural network;

air bag deployment decision means where said crash curve data obtained on collision are supplied to a second neural network having an intermediate layer already trained by means of a learning calculation of a back propagation network architecture and supplied with a predetermined air bag deployment limit curve as a second group of training data, said second neural network comparing data indicative of the crash curve on said collision in accordance with the training result in said second neural network and data obtained from the air bag deployment limit curve and outputting a decision signal indicative of deploying an air bag only when the data for the crash curve are greater than the air bag deployment limit curve; and a logic circuit where an air bag deployment operational command signal is supplied to air bag deployment operation means only when the time to reach the threshold for maximum occupant displacement is obtained in the first neural network and when the second neural network outputs the decision signal indicative of deploying the air bag.

6. A system for predicting impact by using neural networks as claimed in claim 5, wherein each of said first and said second neural networks comprises a two dimensional self-organizing competitive learning layer in said intermediate layer to perform learning operation in said two dimensional self-organizing competitive learning layer.

7. A system for predicting impact by using neural networks as claimed in claim 5, wherein said first group of parallel training data is used for learning calculation by means of converting the crash curve obtained by calculation in said first neural network into displacement data.

8. A system for predicting impact by using neural networks as claimed in claim 7, wherein said first group of parallel training data is supplied in parallel to an input layer of said first neural network after parallel converting a subsequent displacement values within a predetermined range, and displacement values following to said subsequent displacement values are parallel converted into a desired output data to be supplied in parallel to an output layer of said first neural network.

9. A system for predicting impact by using neural networks as claimed in claim 5 wherein said first and said second neural networks are coded after completion of learning to be implemented in a substrate of an air bag operation control circuit.

* * * * *